patented Jan. 13, 1948

2,434,357

UNITED STATES PATENT OFFICE 2,434,357

TETRA-ALKYL CARBONYL TETRATHIO DIPHOSPHATES AND PROCESS FOR THEIR PREPARATION

Arthur H. Fischer, New York, N. Y., assignor to Minerec Corporation, New York, N. Y., a corporation of New York No Drawing. Application September 27, 1943, Serial No. 504,067

6 Claims. (Cl. 260—455)

This invention relates to the production of new organic compounds and has for an object the provision of carbonyl tetrathio diphospho organic compounds. More specifically, the invention contemplates the provision of tetra substituted carbonyl tetrathio diphospho organic compounds. A further object of the invention is to provide tetra esters of carbonyl tetrathio diphosphate.

The invention is based on my discovery that dithiophosphoric acids and salts of the acids can be caused to react with phosgene (carbonyl chloride, $COCl_2$) to produce carbonyl tetrathio diphosphates somewhat in accordance with the following equation:

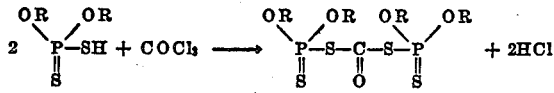

When substitution-products of dithiophosphoric acids or salts of acids containing organic radicals are employed, carbonyl tetrathio diphosphates containing corresponding organic radicals will be produced. Substitution-products of acids and salts containing alkyl radicals or aryl radicals or both may be employed, and, in the above formulae, R represents such radicals.

The use of di-substituted organic compounds results in the production of tetra-substituted compounds, the use of di-substituted esters, for example, results in the production of tetra esters of carbonyl tetrathio diphosphate.

The compounds of the invention are suitable for various uses, and they may be employed with particular advantage as mineral collecting agents in the concentration of minerals by froth flotation. Among the compounds found most suitable for use in such concentration processes are (1) Tetraethyl carbonyl tetrathio diphosphate,
(2) Tetrabutyl carbonyl tetrathio diphosphate, and
(3) Tetracresyl carbonyl tetrathio diphosphate.

The use of the compounds of the invention for the concentration of minerals is described and claimed in my copending application Serial No. 504,068, filed Sept. 27, 1943, issued on May 15, 1945, as U. S. Patent No. 2,376,242.

The following example illustrates a method of preparing compounds in accordance with the invention:

153 grams of pure ammonium diethyl dithiophosphate were suspended, with stirring, in 600 c. c. of ether, and 45 grams of phosgene (120% of theoretical) were passed into the suspension as rapidly as possible. The temperature of the suspension was maintained at about 0° C. The reaction was complete a few minutes after all of the phosgene had been added. Water was added to dissolve the ammonium chloride produced during the course of the reaction, and the water and ether phases were separated. The ether phase was heated under reduced pressure to remove the ether, and a residual water-insoluble oily product was obtained.

The oily product was substantially pure tetraethyl carbonyl tetrathio diphosphate, as indicated by the following data:

The yield was 149.5 grams.

Theoretical yield based on carbonyl compound is 149.8 grams.

|  | By Analysis | Theoretical |
|---|---|---|
| Per cent sulphur | 32.67 | 32.18 |
| Per cent phosphorus | 15.51 | 15.55 |

Carbonyl tetrathio diphosphates containing other organic radicals may be produced by the same procedure or by similar procedures when employing organic dithiophosphates containing such other organic radicals.

I claim:

1. A compound having the following structural formula:

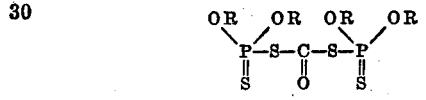

in which R represents a radical of the group consisting of ethyl and butyl.

2. The method of producing a tetra substituted carbonyl tetrathio diphosphate which comprises subjecting a compound of the group consisting of diethyl dithiophosphate and dibutyl dithiophosphate to the action of phosgene.

3. A compound having the following structural formula:

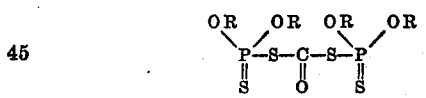

in which R represents an ethyl radical.

4. A compound having the following structural formula:

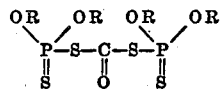

in which R represents a butyl radical.

5. The method of producing tetraethyl carbonyl tetrathio diphosphate which comprises subjecting a diethyl dithiophosphate to the action of phosgene.

6. The method of producing tetrabutyl carbonyl tetrathio diphosphate which comprises subjecting a dibutyl dithiophosphate to the action of phosgene.

ARTHUR H. FISCHER.

REFERENCES CITED

The following references are of record in the file of this patent:

UNITED STATES PATENTS

| Number | Name | Date |
| --- | --- | --- |
| 2,198,915 | MacAfee | Apr. 30, 1940 |
| 1,813,344 | Derby | July 7, 1931 |
| 1,867,632 | Romieux | July 19, 1932 |
| 1,893,018 | Christman | Jan. 3, 1933 |
| 1,949,629 | Romieux | Mar. 6, 1934 |
| 2,048,043 | Williams | July 21, 1936 |
| 2,063,629 | Salzberg | Dec. 8, 1936 |
| 2,266,514 | Romieux | Dec. 16, 1941 |